United States Patent [19]

McNaughton et al.

[11] Patent Number: 5,350,203
[45] Date of Patent: Sep. 27, 1994

[54] QUICK CONNECT TUBING CONNECTOR AND METHOD OF ASSEMBLY

[75] Inventors: James McNaughton, Rochester; Walfred J. Liimatta, Rochester Hills; Mark G. Ketcham, Marine City, all of Mich.

[73] Assignee: Bundy Corporation, Warren, Mich.

[21] Appl. No.: 757,393

[22] Filed: Sep. 10, 1991

[51] Int. Cl.$^5$ .............................................. F16L 35/00
[52] U.S. Cl. ..................................... 285/319; 285/305; 285/321; 285/348
[58] Field of Search .................. 285/93, 319, 321, 776, 285/233, 353, 348, 305

[56] References Cited

U.S. PATENT DOCUMENTS

| | | |
|---|---|---|
| 2,316,974 | 4/1943 | Risley . |
| 2,427,260 | 9/1947 | Cowles . |
| 2,431,120 | 11/1947 | Howe ................................. 285/233 |
| 2,473,502 | 6/1949 | Bard . |
| 2,562,794 | 7/1951 | Cahenzli ............................. 285/353 |
| 2,724,602 | 11/1955 | Carey et al. ........................ 285/233 |
| 2,954,248 | 9/1960 | Brickman . |
| 3,185,501 | 5/1965 | Bowan et al. ....................... 285/348 |
| 3,409,314 | 11/1968 | Roe . |
| 3,414,299 | 12/1968 | Roe . |
| 3,439,944 | 4/1969 | Leutenegger . |
| 3,560,026 | 2/1971 | Roe . |
| 3,601,361 | 8/1971 | Hundhausen et al. . |
| 3,847,421 | 11/1974 | Eschbaugh et al. ................ 285/353 |
| 4,294,473 | 10/1981 | Ekman . |
| 4,610,468 | 9/1986 | Wood . |
| 4,645,245 | 2/1987 | Cunningham . |
| 4,681,351 | 7/1987 | Bartholomew . |
| 4,690,436 | 9/1987 | Hehl .................................. 285/348 |
| 4,725,081 | 2/1988 | Bauer ................................ 285/305 |
| 4,733,890 | 3/1988 | Vyse . |
| 4,750,763 | 6/1988 | Cassidy et al. ..................... 285/371 |
| 4,756,558 | 7/1988 | Beamer .............................. 285/319 |
| 4,778,203 | 10/1988 | Bartholomew ..................... 285/319 |
| 4,781,400 | 11/1988 | Cunningham . |
| 4,832,378 | 5/1989 | Zepp .................................. 285/305 |
| 4,842,309 | 6/1989 | Lavene et al. ...................... 285/353 |
| 4,884,829 | 12/1989 | Funk et al. . |
| 4,964,658 | 10/1990 | Usui et al. .......................... 285/319 |
| 4,978,150 | 12/1990 | Schoot . |
| 4,979,765 | 12/1990 | Bartholomew . |
| 5,002,315 | 3/1991 | Bartholomew . |

FOREIGN PATENT DOCUMENTS

| | | | |
|---|---|---|---|
| 2811985 | 11/1978 | Fed. Rep. of Germany ...... | 285/319 |
| 3710853 | 12/1988 | Fed. Rep. of Germany ...... | 285/319 |
| 2-209691 | 8/1990 | Japan .................................. | 285/319 |
| 453217 | 12/1934 | United Kingdom ................ | 285/343 |

Primary Examiner—Eric K. Nicholson
Attorney, Agent, or Firm—Dorn, McEachran, Jambor & Keating

[57] ABSTRACT

A unique fluid connector is disclosed that quickly connects a tube within a housing bore, while providing a strong, fluid tight seal. The tube has axially spaced radially greater diameter upset portions with a sleeve and a locking member trapped between the upset portions. The locking member includes resilient arms which secure the locking member within the housing bore. The sleeve has a notch at an inner axial end which abuts the inner upset portion to retain the tube within the bore. An O-ring is positioned axially inwardly of the upset portion. The sleeve and the inner upset portion both abut the O-ring to provide a fluid tight seal between the tube and the housing. In a unique method, a tube unit is assembled by forming the outer upset portion on the tube. The locking member and sleeve are then moved onto the tube. The inner upset portion is then formed on the tube to secure the locking member and the sleeve on the tube. An O-ring retaining portion is then formed on the tube, and the O-ring is positioned onto the tube. The assembled tube unit is then inserted into the housing bore.

18 Claims, 2 Drawing Sheets

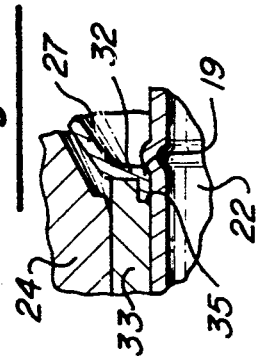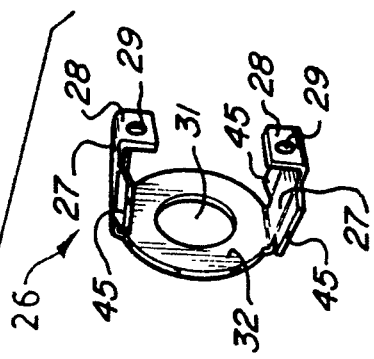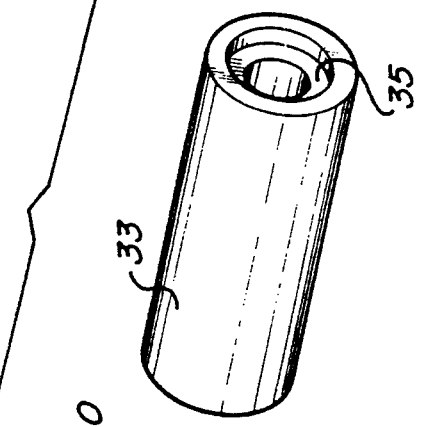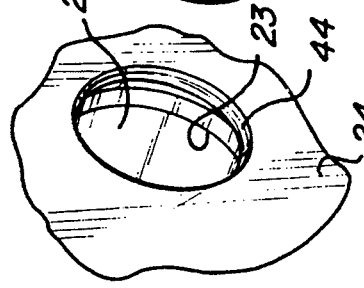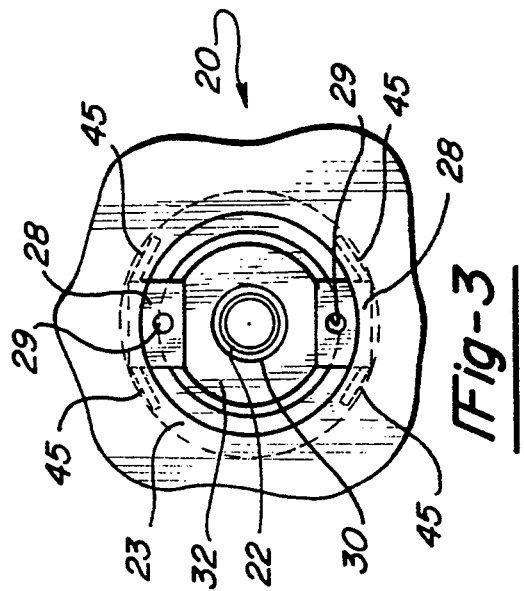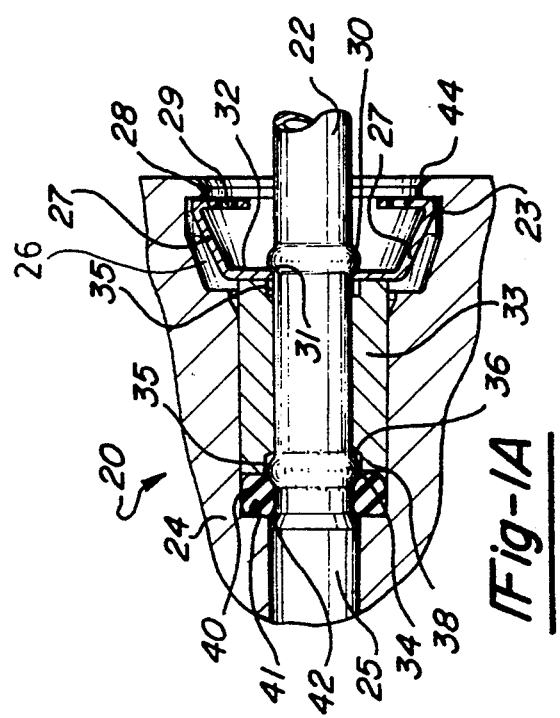

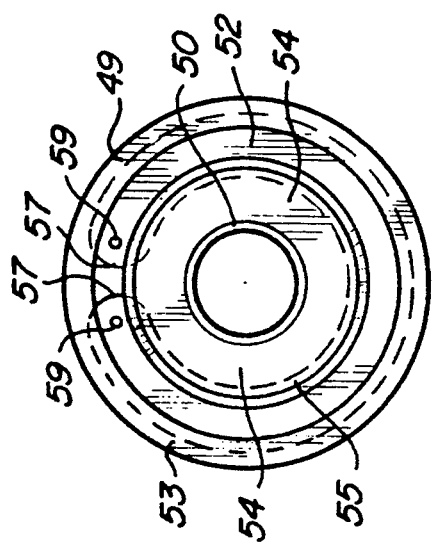
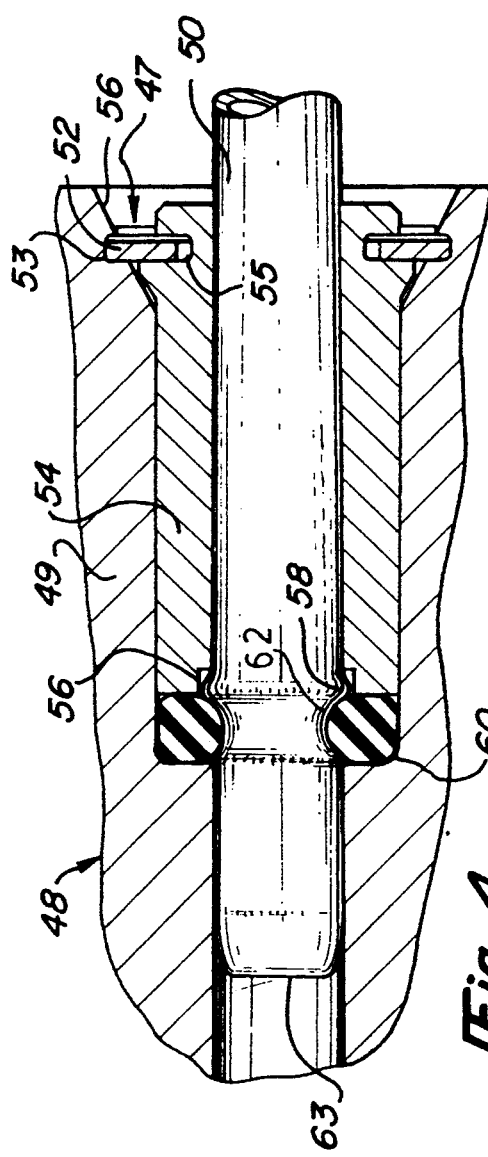
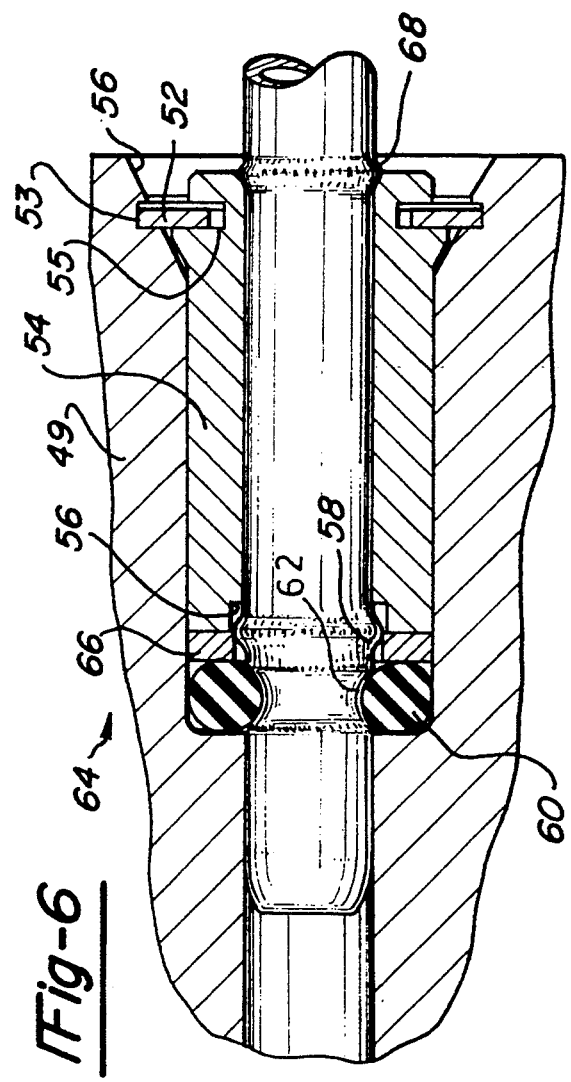

QUICK CONNECT TUBING CONNECTOR AND METHOD OF ASSEMBLY

BACKGROUND OF THE INVENTION

This application relates to a quick connect coupling that provides a strong, fluid tight seal. In addition, a method of assembling such a quick connect coupling is disclosed.

Various quick connect couplings are known to secure high pressure fluid lines such as found in power steering, air conditioning, or power brake systems within a housing. In such high pressure systems, the quick connect coupling must quickly and securely connect tubing within the housing, and must also provide a strong fluid tight seal. Prior art quick connect couplings have some deficiencies in achieving the goals of being quickly connected, providing a strong connection between the tube and the housing, and also providing a fluid tight seal.

One type of coupling disclosed in the prior art includes a bushing secured within the housing and abutting the tube upset portion, retaining the tube in the housing. These prior art structures have provided relatively quick connections, however, they have generally been complex and have not always provided fluid tight seals.

In addition, the means to secure the bushings in these prior art structures have been somewhat deficient. They have not always provided both quick and strong connections between the bushing and the housing.

Finally, prior art quick connect couplings are known in which the tube, a member for securing the tube within a housing, and seals are all inserted into a housing as a one-piece unit. The prior art methods of assembling these one-piece units have been somewhat deficient in the prior art, and overly complex.

SUMMARY OF THE INVENTION

The present invention discloses a unique quick connect tubing connector which provides a strong connection between a tube and a housing, and also provides a fluid tight seal. Further, a method of assembling this quick connect tubing connector is disclosed which is less complex than prior art methods of assembly.

In one disclosed embodiment, a tube is received within a bore in a housing. A locking member secures a sleeve within the bore. A notch at an axial end of the sleeve positioned into the bore abuts a first radially greater, or upset portion, of the tube, retaining the tube within the bore. In a preferred embodiment of the present invention, an outer portion of the notch abuts a seal radially outwardly of the upset portion to provide a fluid tight connection between the housing and tube.

In another aspect of the present invention, the locking member has plural circumferentially-spaced resilient arms which have a radially outer relaxed dimension greater than the inner radial dimension of an entrance portion to the bore. When fully connected, the locking member is received within a portion of the bore which has a greater radial dimension than the relaxed dimension. The arms are biased inwardly while entering the bore and moving through the entrance portion. When the arms move axially into the greater radial dimension portion of the bore, they spring outwardly to the relaxed dimension. In this position the arms retain the locking member, and consequently the sleeve and tube, within the bore.

Most preferably, the resilient arms have circumferentially-spaced braces at each circumferential end. The braces extend slightly radially inwardly and circumferentially from the arms.

Preferably, the arms each have a tang extending radially inwardly from an outer end. The tangs preferably have holes to facilitate removal of the locking member. An inner end of each arm is connected to a ring-shaped member. The ring-shaped member abuts the sleeve, and securing it in the bore.

In another preferred feature, the tube has a second upset portion formed axially outwardly of the locking member and sleeve. The locking member and sleeve are thus trapped and received between the first and second upset portions of the tube. A seal is received between the first upset portion and an inner end of the tube. The sleeve abuts this seal. The assembled tube, sleeve, locking member, and seal may then all be inserted into the bore as a unit.

In another aspect of the present invention, a method of assembling the quick connect tubing connector is disclosed in which the second upset portion is formed on the tube at a position spaced axially from one end. The locking member and sleeve are positioned on the one end of the tube, and moved to a position where they abut this first upset portion. A first upset portion is then formed axially between the end of the sleeve and the one end of the tube, trapping the sleeve and locking member between the first and second upset portions. A seal securing portion is then formed between the first upset portion and the one end, and a seal is secured by the seal securing portion. The assembled tube connector is then inserted into the bore, where it is quickly connected to provide a strong, fluid tight seal between the tube and the housing.

These and other objects and features of the present invention can be best understood from the following specification and drawings of which the following is a brief description.

BRIEF DESCRIPTION OF THE DRAWINGS

FIG. 1A is a cross-sectional view through a first embodiment of the present invention.

FIG. 1B is a view similar to FIG. 1A, but showing a slight modification.

FIG. 2 is a partial exploded view of portions of the connector of the present invention.

FIG. 3 is an end view of the device illustrated in FIG. 1A.

FIG. 4 is a cross-sectional view similar to FIG. 1A, but through a second embodiment of the present invention.

FIG. 5 is an end view the connector illustrated in FIG. 4.

FIG. 6 is a cross-sectional view similar to FIG. 3, but showing a third embodiment of the present invention.

DETAILED DESCRIPTION OF A PREFERRED EMBODIMENT

FIG. 1A shows fluid connector 20 for connecting a tube 22 within a bore 25 in housing 24. Tube 22 is preferably connected to a source of high pressure fluid, such as a hydraulic brake, air conditioning, or power steering line. A retainer or locking member 26 has a pair of resilient arms 27, which include tangs 28 extending radially inwardly from an outer end of arms 27 adjacent an outer end of bore 25. Arms 27 are shown in a relaxed position where tangs 28 abut a face 23 of bore 25, preventing removal of locking member 26 from bore 25. Tangs 28 have holes 29 into which a tool may be inserted to bias arms 27 radially inwardly for insertion or removal of locking member 26.

Tube 22 has an axially outer radially enlarged, or upset, portion 30 adjacent an axially outer end of bore 25. A bore 31 is formed in a ring-shaped member 32, and is received on tube 22 such that upset portion 30 abuts an axially outer face of ring-shaped member 32. A compressible steel spacer, bushing or sleeve 33 is positioned on an inner face of ring-shaped member 32. Sleeve 33 and locking member 26 are trapped on tube 22 between upset portion 30 and an axially inner upset portion 34. Sleeve 33 has a notch 35 formed adjacent inner upset portion 34, and consisting of a radially inner portion 36 which abuts upset portion 34 and a radially outer portion 38 which is axial aligned with, and radially outwardly of, inner upset portion 34.

An O-ring seal 40 is positioned axially between portion 38 of sleeve 33 and an inner face 41 of bore 25. Both sleeve portion 38 and tube inner upset portion 34 abut seal 40 and force seal 40 into sealing engagement with face 41, providing a fluid tight seal. An expanded end 42 of tube 22 secures seal 40 on tube 22.

Tube 22 is preferably inserted into bore 25 with locking member 26, sleeve 33, and O-ring 40 all received as an assembled unit. The assembled unit passes easily into bore 25 until resilient arms 27 of locking member 26 encounter conical entrance portion 44. Arms 27 are then biased radially inwardly, either with tile assistance of a tool in holes 29, or by the conically inwardly extending face of conical entrance portion 44. Locking member 26 thus moves axially past entrance portion 44.

Once past entrance portion 44, locking arms 27 spring radially outwardly to their relaxed position, such that tangs 28 abut face 23 of bore 25. In this way locking member 26 is secured within bore 25. Ring-shaped member 32 abuts an outer end of sleeve 33. Portion 36 is forced against upset end 34, securing tube 22 within bore 25.

As shown in FIG. 1B, a cylindrical lip 19 may extend axially inwardly from ring-shaped member 32, and be received in notch 35.

Details of locking member 26, sleeve 33 and O-ring 40 can be best understood from FIG. 2. Bore 25 is formed within housing 24 and has conical entrance portion 44 and face 23. O-ring 40 is spaced axially inwardly from sleeve 33. Sleeve 33 preferably has notch 35 at each axial end, such that sleeve 33 may be used in either axial direction. Locking member 26 has arms 27 extending axially and radially outwardly from ring-shaped member 32. Tangs 28 extend radially inwardly from an outer end of arms 27 and have holes 29. Ring-shaped member 32 has bore 31.

Braces 45 extend circumferentially and slightly radially inwardly from circumferential ends of each arm 27. Braces 45 add strength to arms 27 and resist buckling should a force be applied to attempt to remove tube 22 from bore 25.

FIG. 3 is an end view of coupling 20 as illustrated in FIG. 1A. Tube 22 is received within a center of bore 25. Upset end 30 abuts an outer face of ring-shaped member 32. Tangs 28 extend radially inwardly and abut wall 43. Braces 45 extend circumferentially and radially inwardly from tangs 28.

FIG. 4 shows a second embodiment connector 48. Tube 50 is secured within a bore 47 in housing 49 by a lock ring 52 received within a notch 53. Lock ring 52 is also received within a notch 55 on sleeve 54. Conical entrance portion 56 extends to the outer end of bore 47.

The assembled tube unit is inserted, and ring 52 snaps into notch 53 locking sleeve 54 within housing 49. Sleeve 54 has a notch 56 positioned adjacent upset portion 58. In this regard it secures tube 50 within housing 49 similar to the first embodiment. O-ring 60 is secured by a ditch 62 formed at an axial position between upset portion 58 and an end 63 of tube 50.

FIG. 5 shows details of lock ring 52 for use with second embodiment 48. Lock ring 52 includes a pair of spaced ends 57. Holes 59 are formed adjacent ends 57, and may receive a tool such that ends 57 can be biased towards each other to facilitate insertion or removal of lock ring 52 through the conical entrance portion 56. The combination of biasing ends 57 circumferentially together, and the conically inwardly tapered surface of conical entrance portion 56, assist in the insertion of lock ring 52 into notch 53.

FIG. 6 shows a third embodiment connector 64. Third embodiment 64 is similar to second embodiment 48 except that a spacer seal 66 is positioned axially adjacent upset portion 58. The end of sleeve 56 which forms notch 56 abuts spacer 66 to provide a fluid tight seal. O-ring 60 is received within ditch 62. A second upset portion 68 is formed at an outer axial end of tube 50 to secure sleeve 54 and lock ring 52 on tube 50.

A method of forming the various fluid connections will now be disclosed with reference to the drawings. The tube is initially of a generally uniform outer diameter. An upset portion 30 or 68 is formed at a position spaced from a first end of the tube. In the second embodiment, shown in FIG. 4, this step is eliminated. The sleeve and locking member, or lock ring, are then moved onto the tube from the one end towards the upset portion. The inner upset portion 34 or 58 is then formed to secure the sleeve and locking member on the tube. A seal securing member 42 or 62 is then formed between the inner upset portion and an inner end of the tube. The seal is then placed on the seal securing member. The assembled unit is then inserted into the bore in the housing.

In a preferred embodiment, the ditch 42 is a rolled groove. The upset portions are formed by a standard upset machine. The flared end is also formed by standard machining methods.

Most preferably locking member 26 is formed of a stainless steel. Further, the sleeve is preferably formed from 12L14 steel. The O-ring is preferably of the type commonly known as E.P.D.M.

Preferred embodiments of the present invention have been disclosed, however, a worker of ordinary skill in the art would recognize that certain modifications would come within the scope of this invention. Thus, the following claims should be studied in order to determine the true scope and content of this invention.

We claim:
1. A fluid connector comprising:
a housing defining a bore, said bore extending axially inwardly into said housing, said bore having an entrance portion of a relatively small first radial dimension at an outer end of said bore, and a greater radial portion of a second dimension positioned axially inwardly from said entrance portion; and a tube received within said bore, said tube being secured within said bore by a locking member, said locking member having resilient arms extending away from a ring-shaped member, said arms having a relaxed outer radial dimension intermediate said first and second dimensions and being biased inwardly as said locking member is moved into said bore and through said entrance portion, said arms springing radially outwardly to said relaxed dimension, securing said locking member within said bore when said locking member reaches said greater radial portion, said ring-shaped member abutting an outer axial extent of a sleeve, and an inner axial extent of said sleeve abutting a radially greater portion of said tube, such that said ring-shaped member of said locking member retains said sleeve within said bore, and said sleeve retains said tube within said bore.

2. A fluid connector as recited in claim 1, wherein said arms extend over limited circumferential extents of said locking member, and braces extend circumferentially and slightly radially inwardly from each circumferentially side of said arms to add strength.

3. A method of assembling a tube unit for insertion within a housing, comprising the steps of:
  (1) forming an outer radially greater portion on a tube at an axial location spaced from a first axial end of said tube;
  (2) placing a locking member on said tube between said outer radially greater portion and said first end;
  (3) placing a sleeve on said tube between said locking member and said first end, such that said locking member is secured on said tube between said outer radially greater portion and an outer axial extent of said sleeve;
  (4) forming an inner radially greater portion between said sleeve and said first end to secure said sleeve on said tube;
  (5) forming a seal retaining portion in said tube between said inner radially greater portion and said first end of said tube; and
  (6) placing a seal on said seal retaining portion.

4. The method as recited in claim 3, wherein the step of forming a seal retaining portion includes flaring said first end radially outwardly.

5. The method as recited in claim 3, wherein the step of forming a seal retaining portion includes forming a radially inwardly extending ditch between said inner radially greater portion and said first end.

6. A fluid connector as recited in claim 1, wherein a second radially greater portion is formed on said tube axially outwardly of said outer axial extent of said sleeve, said second radially greater portion retaining said sleeve and said locking member on said tube.

7. A fluid connector as recited in claim 6, wherein said second radially greater portion abuts said ring-shaped member of said locking member.

8. A fluid connector as recited in claim 1, wherein tangs extend radially inwardly from an outer axial end of said arms, said tangs abutting an inner face of said housing to retain said locking member within said housing.

9. A fluid connector as recited in claim 8, wherein said tangs have holes extending axially therethrough.

10. A fluid connector as recited in claim 6, wherein a seal is received axially inwardly of said radially greater portion of said tube.

11. A fluid connector as recited in claim 10, wherein said seal abuts said radially greater portion.

12. A fluid connector as recited in claim 10, wherein said seal is an "O" ring.

13. A fluid connector as recited in claim 10, wherein said seal consists of a first resilient washer positioned axially inwardly of said inner axial extent of said sleeve, and an "O" ring positioned on an inner axial side of said washer.

14. A fluid connector as recited in claim 13, wherein a radially inwardly extending ditch is formed axially inwardly of said radially greater portion, said "O" ring being received in said ditch.

15. A fluid connector as recited in claim 10, wherein an inner axial end of said tube is flared radially outwardly to retain said seal on said tube.

16. A fluid connector comprising:
  a housing defining a bore, said bore extending axially inwardly into said housing from an entrance portion, a radial face being defined in said bore axially inwardly of said entrance portion;
  a tube received within said bore, said tube having a first upset portion of relatively large diameter;
  a sleeve surrounding said tube axially outwardly of said first upset portion, an axially inner end of said sleeve contacting said first upset portion to retain said tube in said bore;
  a retainer surrounding said tube axially outwardly of said sleeve, an axially inner end of said retainer contacting an axially outer end of said sleeve to retain said sleeve in said bore, said retainer having arms extending away from said axially inner end of said retainer and contacting said radial face to retain said retainer in said bore; and
  a second upset portion formed on said tube axially outwardly of said axially inner end of said retainer, said second upset portion securing said sleeve and said retainer on said tube.

17. A fluid connected as recited in claim 16, wherein the outer diameter of said sleeve is substantially equal to the diameter of a portion of said bore, such that said sleeve fits snugly in said bore and minimizes radial displacement of said tube.

18. A fluid connected as recited in claim 16, wherein a seal is received on said tube axially inwardly of said first upset portion.

* * * * *